United States Patent
Jensen

(10) Patent No.: US 9,234,505 B2
(45) Date of Patent: Jan. 12, 2016

(54) TUNED LIQUID DAMPER OF A WIND TURBINE

(71) Applicant: SIEMENS AKTIENGESELLSCHAFT, München (DE)

(72) Inventor: Daniel Kai Jensen, Horsens (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/485,951

(22) Filed: Sep. 15, 2014

(65) Prior Publication Data

US 2015/0167643 A1    Jun. 18, 2015

(30) Foreign Application Priority Data

Dec. 12, 2013   (EP) ..................................... 13196821

(51) Int. Cl.
| | |
|---|---|
| *F03D 11/00* | (2006.01) |
| *F03D 7/02* | (2006.01) |
| *F03D 11/02* | (2006.01) |
| *F03D 1/00* | (2006.01) |
| *F03D 9/00* | (2006.01) |

(52) U.S. Cl.
CPC .............. *F03D 11/0075* (2013.01); *F03D 1/00* (2013.01); *F03D 7/0296* (2013.01); *F03D 9/002* (2013.01); *F03D 11/00* (2013.01); *F03D 11/028* (2013.01); *F05B 2240/14* (2013.01); *F05B 2260/302* (2013.01); *F05B 2260/964* (2013.01)

(58) Field of Classification Search
CPC ... F03D 11/00; F03D 11/0075; F03D 11/028; F03D 1/00; F03D 7/0296; F03D 9/002; F05B 2240/14; F05B 2260/302; F05B 2260/964

See application file for complete search history.

(56) References Cited

U.S. PATENT DOCUMENTS

| | | | | |
|---|---|---|---|---|
| 4,924,639 | A | * | 5/1990 | Sato et al. ..................... 52/167.2 |
| 4,935,651 | A | * | 6/1990 | Hong et al. ....................... 310/51 |
| 4,951,441 | A | * | 8/1990 | Noji et al. ..................... 52/741.1 |
| 6,672,837 | B1 | * | 1/2004 | Veldkamp et al. ............ 416/144 |
| 6,695,588 | B1 | * | 2/2004 | Nielsen ..................... 416/244 R |
| 7,819,624 | B2 | * | 10/2010 | Bonnet ......................... 415/119 |
| 7,931,438 | B2 | * | 4/2011 | Schellings ........................ 416/1 |

(Continued)

FOREIGN PATENT DOCUMENTS

| | | |
|---|---|---|
| EP | 1855000 A1 | 11/2007 |
| JP | 2003176774 A * | 6/2003 ............. F03D 11/04 |

OTHER PUBLICATIONS

European Search Report—Application No. 13196821.6; 6 pgs.

*Primary Examiner* — Tulsidas C Patel
*Assistant Examiner* — S. Mikailoff
(74) *Attorney, Agent, or Firm* — Schmeiser Olsen & Watts LLP

(57) ABSTRACT

A liquid damper in a wind turbine is provided. A damper system of a direct driven wind turbine is disclosed, whereby the wind turbine comprises a nacelle, a rotor hub and an electric generator. The electric generator comprises a rotor and a non-rotating part. The rotor hub is connected to the rotor of the electric generator. The non-rotating part of the generator is connected to the nacelle. The wind turbine comprises a damper system to at least partially eliminate an unwanted movement of the wind turbine resulting from wind loads, whereby the damper system comprises a liquid damper. The damper system is arranged at a non-rotating part of the electric generator.

16 Claims, 2 Drawing Sheets

(56) References Cited

U.S. PATENT DOCUMENTS

| | | | |
|---|---|---|---|
| 8,358,028 B2* | 1/2013 | Stiesdal | 290/55 |
| 8,786,124 B2* | 7/2014 | Castell Martinez | F03D 11/028 290/44 |
| 8,786,151 B1* | 7/2014 | Cole et al. | 310/90 |
| 8,878,377 B2* | 11/2014 | Ollgaard et al. | 290/44 |
| 2003/0147753 A1 | 8/2003 | Ollgaard | |
| 2006/0147306 A1* | 7/2006 | Zheng et al. | 416/1 |
| 2009/0148289 A1* | 6/2009 | Edenfeld | F03D 11/00 416/145 |
| 2010/0045047 A1 | 2/2010 | Stiesdal | |
| 2010/0117368 A1* | 5/2010 | Benito et al. | 290/55 |
| 2010/0314884 A1* | 12/2010 | Ollgaard et al. | 290/55 |
| 2011/0150631 A1* | 6/2011 | Choi | F03D 11/00 415/119 |
| 2011/0260465 A1* | 10/2011 | Pedersen | F03D 1/001 290/55 |
| 2012/0076652 A1* | 3/2012 | Ventzke et al. | 416/1 |
| 2012/0315129 A1* | 12/2012 | Castell Martinez | F03D 11/028 415/122.1 |
| 2013/0134712 A1 | 5/2013 | Rodriguez Tsouroukdissian | |
| 2013/0280064 A1* | 10/2013 | van Steinvoren | 416/1 |
| 2014/0133985 A1* | 5/2014 | Mongeau | F03D 9/002 416/95 |
| 2014/0312625 A1* | 10/2014 | Castell Martinez | F03D 11/028 290/55 |
| 2015/0211496 A1* | 7/2015 | Frydendal | 416/145 |

* cited by examiner

TUNED LIQUID DAMPER OF A WIND TURBINE

CROSS REFERENCE TO RELATED APPLICATIONS

This application claims priority to EP Application No. EP 13196821.6 having a filing date of Dec. 12, 2013, the entire contents of which are hereby incorporated by reference.

FIELD OF TECHNOLOGY

The following relates to a liquid damper in a wind turbine.

BACKGROUND

A wind turbine comprises a tower, a nacelle, and a rotor. The rotor is rotatable connected to the nacelle of the wind turbine and the nacelle is rotatable connected to the tower. The rotor comprises rotor blades and a rotor hub. The wind interacts with the rotor blades. This interaction leads to a rotation of the rotor hub. The rotational energy is transmitted to an electric generator and is there transferred into electrical energy. The wind induces vibrations in the wind turbine. Vibrations reduce the lifetime of the components of the wind turbine and are therefore unwanted in the wind turbine.

The wind turbine comprises a passive damper system to reduce or eliminate vibrations in the wind turbine. The passive damper system can be a liquid damper, like a liquid sloshing type damper, also called tuned liquid damper, for example. It is known to mount the tuned liquid dampers in the tower of the wind turbine or in the nacelle. This shows the disadvantage that the tanks of the tuned liquid dampers take up space in the tower of the nacelle of the wind turbine. Often this space is needed during installation or service by personnel, or the space is needed to install equipment or components in the wind turbine.

In addition, the tuned liquid dampers are more effective when they are connected to a load transferring structure in the wind turbine. The connection is normally established by bolts, thus holes for the bolts are needed in the load transferring structure. This shows the disadvantage that the load transferring structure is weakened by the holes, thus the load transferring structure needs to be built with more material to provide the same strength as without bolt holes. This increases the weight of the wind turbine and thus the costs spent on the material and transportation of the wind turbine. In addition, these details increase the complexity of the casted structure and thus the overall costs of the wind turbine.

Thus, a need exists for an improved concept of a tuned liquid damper of a wind turbine.

SUMMARY

An aspect relates to a damper system of a direct driven wind turbine, whereby the wind turbine comprises a nacelle, a rotor hub and an electric generator. The electric generator comprises a rotor and a non-rotating part. The rotor hub is connected to the rotor of the electric generator. The non-rotating part of the generator is connected to the nacelle.

The wind turbine may comprise a damper system to at least partially eliminate an unwanted movement of the wind turbine resulting from wind loads, whereby the damper system comprises a liquid damper. The damper system can be arranged at a non-rotating part of the electric generator.

A direct driven wind turbine comprises a generator with a rotor and a stator. The rotor hub of the wind turbine, comprising the rotor blades, can be connected directly to the rotor of the generator. The stator of the electric generator is a part of the non-rotating part of the generator, and can be connected to the nacelle of the wind turbine.

The wind interacts with the rotor blades of the wind turbine and causes a rotation of the rotor hub of the wind turbine. The rotor hub of the wind turbine is connected to the rotor of the generator. Thus, the rotation of the rotor hub is directly transferred to the electrical generator. In the electric generator, the rotation of the rotor is transformed into electrical energy.

While the wind interacts with the wind turbine, loads and vibrations are induced into the wind turbine. These loads and vibrations induced into the wind turbine lead to a vibration of the wind turbine. A vibration reduces the lifetime of the wind turbine especially when the eigenfrequency is reached. Thus, a damper system is arranged within the wind turbine. The damper system comprises a liquid tank, thus, the damper system comprises a liquid damper.

The damper system is arranged at the non-rotating part of the electric generator. The electric generator of a direct driven wind turbine is quite large and shows a hollow space. The liquid damper can be arranged within this hollow space. Thus, the liquid damper may not take up space within the nacelle or the tower of the wind turbine.

The higher up in a wind turbine a damper system is placed, the more efficient is the damping effect. The generator of the wind turbine can be placed at the height of the nacelle. A damper system located in the non-rotating part of the generator can be more efficient then a damper system in the tower of the wind turbine. Thus, a damper system in the tower can be more efficient then in the tower of the wind turbine.

The damper system may comprise a rack and at least two liquid tanks. The damper system may be a liquid damper and thus may comprise a liquid tank. At least two liquid tanks can be arranged to form the damper system. The at least two liquid tanks may be mounted to a rack. Thus, a rack can be used to connect the liquid tanks together, and to the non-rotating part of their electric generator. The rack may comprise a magnet, and the rack may be connected to the non-rotating part of the generator by magnetic force. At least one magnet can be mounted to the rack of the liquid damper. The non-rotating part of the generator is made of metal, thus, the magnet can connect with the non-rotating part of the generator. Thus, the rack can be connected to the non-rotating part of the generator by magnetic force. Thus, no mechanical connection means may be necessary.

Mechanical connection means may need a hole drilled into the non-rotating part of the generator to connect the rack with the non-rotating part of the generator. A hole in the non-rotating part of the generator may weaken the structure of the non-rotating part. By connecting the rack by magnetic force to the non-rotating part of the generator, holes for mechanical connection means in the non-rotating part of the generator are avoided. The rack can be connected to the non-rotating part by magnetic force and not by mechanical connection means, thus, a weakening of the non-rotating part of the generator by holes is avoided.

The liquid tanks may be cuboids, whereby a width is smaller than a length, and a height is smaller than the width. Thus, the liquid tanks may be flat cuboids. The rotor hub of the wind turbine and the rotor of the electric generator may define a rotational axis of the wind turbine.

The wind interacts with the wind turbine mainly parallel to the rotational axis of the wind turbine during the operation of the wind turbine. Thus, loads and vibrations are induced into the wind turbine mainly parallel to the rotational axis of the wind turbine.

The width of the liquid tanks can be smaller than the length. Thus, the liquid tanks may comprise a longish, or elongated, shape. The long side of the liquid tanks can be arranged mainly parallel to the rotational axis of the wind turbine. The length of the liquid tanks may be selected according to the frequency of the vibrations of the wind turbine that should be eliminated, and the properties of the liquid that is capable to move inside the liquid tanks. Thus, the form of the liquid tank may be selected to optimize the damping of the vibrations induced by the wind into the wind turbine.

The at least two liquid tanks can be arranged in a stacked manner. The liquid tanks of the damper can be arranged in a rack. In embodiments where the at least two liquid tanks are arranged in a stacked manner, they are arranged on top of each other.

As the height of the liquid tanks may be smaller than the width and the length, the liquid tanks may take up less area when they are stacked on top of each other. Thus, the use of the room within the wind turbine is optimized.

The non-rotating part of the generator can comprise a stator and a shaft, wherein the rack may be arranged at the shaft. An electric generator comprises a stator. The stator is mounted to a shaft. The rack may comprise the liquid tanks of the damper system and is connected to the shaft. The shaft of the electric generator supports the stator and is connected to the nacelle of the wind turbine. The rack is connected to the shaft, thus, the shaft supports the rack and connects the rack to the nacelle of the wind turbine. The shaft comprises a cavity and the rack can be arranged within the cavity.

In a direct driven wind turbine, the generator is quite large and may comprise a diameter up to several meters. The stator of the electric generator is arranged in the outer part of the generator. The stator is supported by a shaft. A support structure might be arranged between the stator and the shaft. The support structure supporting the stator can be a part of the shaft of the electrical generator.

A cavity is formed between the stator of the electrical generator and the shaft. In the case of a direct driven wind turbine, the shaft might have a diameter bigger than one meter. Thus, also a cavity is formed within the shaft of the electrical generator in the case of a hollow shaft. These cavities may not be used otherwise and are empty. The rack comprises the liquid tanks of the damper system, and can be connected to the shaft of the electrical generator. The rack with the damper system can be arranged within one of the cavities of the generator. Thus, the rack can be arranged within the hollow shaft of the generator or within a cavity between the shaft and the stator of the generator. The rack may also be arranged in a space within the wind turbine that is not used otherwise, and thus the rack does not take up space that is necessary for other installations.

The rotor of the electric generator is arranged rotatable around a non-rotating part of the generator. The generator can be of the type of an outer rotor generator. The stator can be arranged inside of the rotor of the generator. The support structure of the stator and the shaft can be arranged radially inward of the stator. The shaft, the support structure and the stator can form the inner part of the generator. The whole inner part of the generator can be the non-rotating part. Thus, the damper system with the liquid tanks and the rack can easily be arranged and connected to the non-rotating part of the generator.

The shaft of the non-rotating part of the electrical generator is hollow and a damper system can be arranged within the hollow shaft. The electric generator of a direct driven wind turbine may comprise a diameter of up to several meters. In addition, also the shaft of the direct driven generator may have a diameter of more than one meter. To save weight of the components of the wind turbine, the shaft of the electrical generator can be hollow. Thus, the shaft of the electrical generator may comprise a cavity and rack and the damper tanks can be arranged within the cavity. The axis of rotation of the rotor hub and the rotor of the electrical generator may go through the cavity within the hollow shaft of the generator. The rack and the damper tanks, arranged in the cavity within the shaft, can be arranged close to the axis of rotation of the electrical generator. Thus, the vibrations that are induced into the wind turbine by the wind can be eliminated by the dampers without introducing an eccentric mass into the wind turbine.

In addition the damper can be placed high up in the wind turbine. The lever between the ground the wind turbine can be placed on and the damper system is large and thus the damping effect is increased.

The rack can be mounted to a side wall of the non-rotating part of the generator. The rack with the damper tanks can be mounted to the side walls of the non-rotating part, for example, magnetically. The rack with the damper system may not be taking up the space around the rotational axis of the electrical generator. Thus, the space around the rotational axis stays free for installations like cable turning equipment, hydraulic connections or equipment measuring the rotation of the wind turbine.

In addition, an aisle can be kept free within the generator. Thus, service personnel can pass through the generator and can easily reach the rack and the damper system while passing through the generator along the aisle.

BRIEF DESCRIPTION

Some of the embodiments will be described in detail, with reference to the following figures, wherein like designations denote like members, wherein.

DETAILED DESCRIPTION

Figure 1:
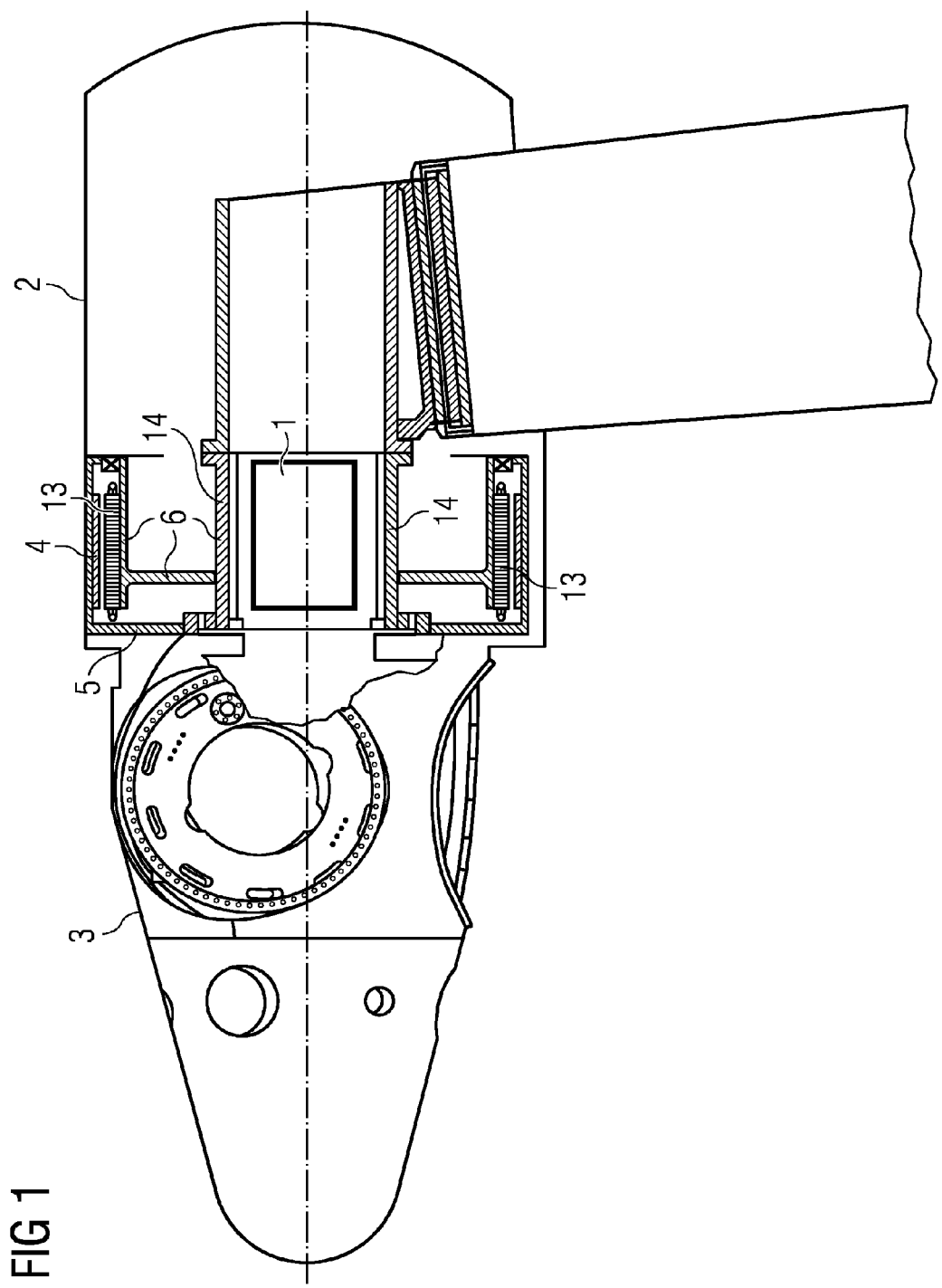
FIG. 1 shows an embodiment of a wind turbine with a damper system.

FIG. 1 shows an embodiment of a wind turbine with a damper system 1. The wind turbine comprises a nacelle 2 and a rotor hub 3. The rotor hub 3 is connected to the rotor 5 of the electrical generator 4. The rotor hub 3 is prepared to be equipped with rotor blades.

The electrical generator 4 comprises a rotor 5 and a stator 13. The stator 13 is supported by the support structure 6 that is connected to a shaft 14. The stator 13 the support structure 6 and a shaft 14 form the non-rotating part of the generator. The shaft 14 of the electrical generator 4 is connected to a support structure within the nacelle 2 of the wind turbine.

When the wind turbine is in operation, the wind interacts with the rotor blades and the rotor hub 3 rotates together with the rotor 5 of the electrical generator 4. The rotor 5 of the electrical generator rotates in respect to the stator 13 of the electrical generator 4.

A cavity is formed within the non-rotating part 6 of the generator 4. One cavity is formed between the shaft 14 and the stator 13, and another cavity is formed within the hollow shaft 14.

A damper system 1 is arranged within the hollow shaft 14 of the electrical generator 4.

During the operation of the wind turbine the wind induces loads and vibrations into the wind turbine through the rotor and the tower of the wind turbine. The vibrations are transferred from the rotor hub 3 and the rotor 5 of the electrical generator 4 to the shaft 14 and to the nacelle 2 of the wind turbine. In addition the vibrations from the tower of the wind turbine are transferred over the support structure of the wind turbine to the shaft 14 of the wind turbine. The damper system 1 is prepared to eliminate the vibrations induced into the wind turbine by the wind.

Figure 2:
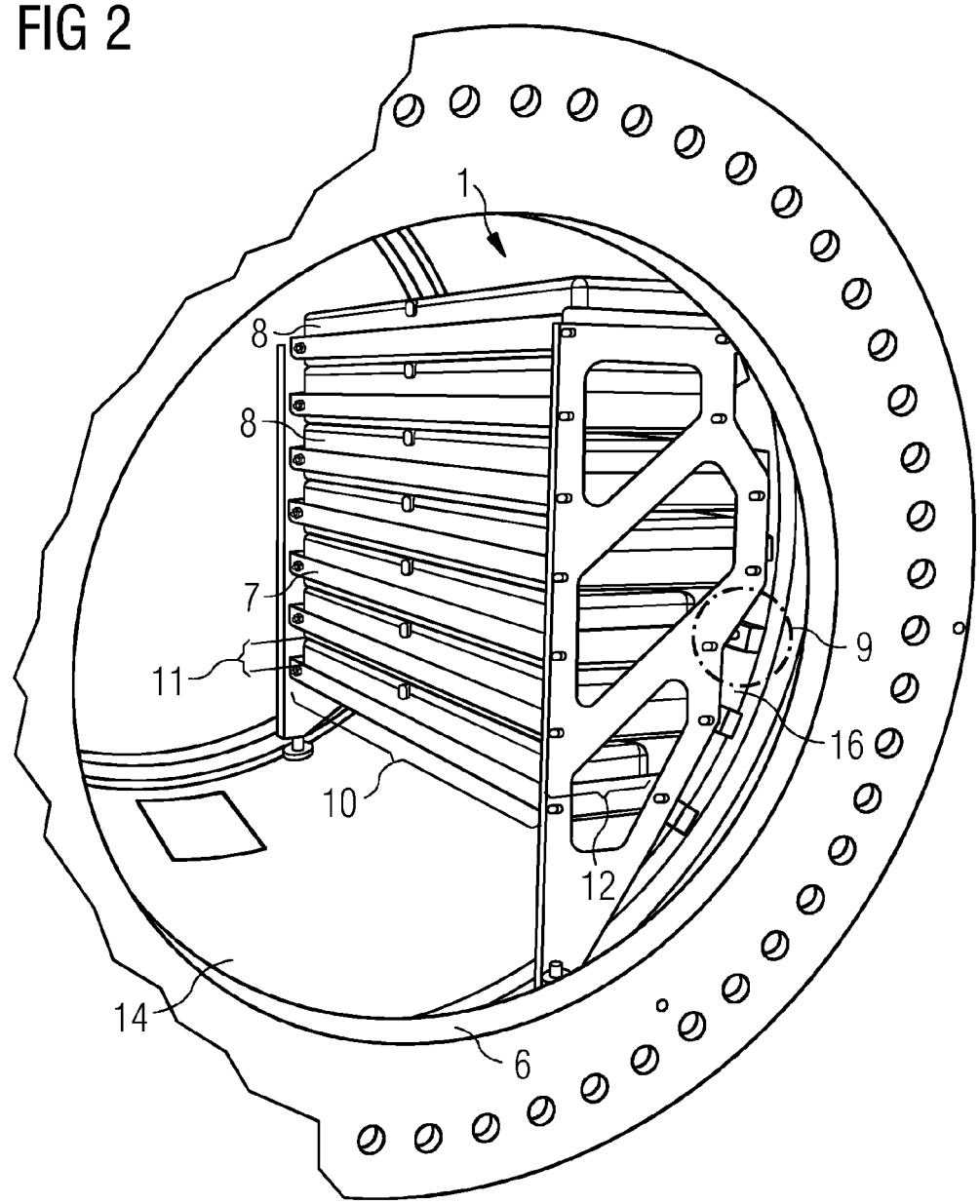
FIG. 2 shows an embodiment of a damper system of a direct driven wind turbine.

FIG. 2 shows an embodiment of a damper system 1 of a direct driven wind turbine. The damper system 1 is arranged within the hollow shaft 14 of the non-rotating part 6 of the electrical generator.

The damper system comprises a rack 7 and at least two liquid tanks 8. The damper tanks 8 show a certain length 10, a certain width 12, and a certain height 11. The height 11 of the damper tank 8 is smaller than the width 12. The width 12 of the damper tank is smaller than the length tank 10 of the damper tank 8.

The damper tanks 8 are arranged in a stacked manner within the rack 7 of the damper system.

The rack 7 is connected to the side wall 16 of the hollow shaft 14 of the non-rotating part 6 of the electrical generator. The rack is connected to the side wall of the shaft by magnets 9.

The liquid tanks 8 are arranged along the side wall 16 of the shaft 14, mainly parallel to the axis of rotation of the electrical generator 4.

Beside the damper system 1, enough free space is provided within the shaft 14 for service personnel to walk through the hollow shaft 14 of the electrical generator.

The illustration in the drawings is in schematic form. It is noted that in different figures, similar or identical elements are provided with the same reference signs.

Although the present invention has been described in detail with reference to exemplary embodiments, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A damper system of a direct driven wind turbine, the direct driven wind turbine including a nacelle, a rotor hub, and an electric generator, the electric generator comprising a rotor and a non-rotating part, the rotor hub being connected to the rotor of the electric generator, wherein the non-rotating part is connected to the nacelle, the damper system comprising:
a liquid damper, wherein the damper system of the direct driven wind turbine at least partially eliminates an unwanted movement of the direct driven wind turbine resulting from wind loads;
wherein the damper system is disposed within a cavity of a hollow shaft of the non-rotating part of the electric generator of the direct driven wind turbine; and
wherein the liquid damper is mounted to a side wall of the non-rotating part of the electric generator.

2. The damper system according to claim 1, wherein the liquid damper comprises a rack and at least two liquid tanks.

3. The damper system according to claim 2, further comprising a magnet, wherein the rack is mounted to the non-rotating part of the electric generator by magnetic force.

4. The damper system according to claim 2, wherein the at least two liquid tanks are cuboids, and a width is smaller than a length, and a height is smaller than the width.

5. The damper system according to claim 2, wherein the at least two liquid tanks are arranged in a stacked manner.

6. The damper system according to claim 2, wherein the non-rotating part of the electric generator comprises a stator and the hollow shaft.

7. The damper system according to claim 1, wherein the rotor of the electric generator is arranged rotatably around the non-rotating part of the electric generator.

8. The damper system according to claim 1, wherein the damper system located proximate an axis of rotation of the electrical generator.

9. A direct driven wind turbine, the direct driven wind turbine including a nacelle, a rotor hub, and an electric generator, the electric generator comprising a rotor and a non-rotating part, the rotor hub being connected to the rotor of the electric generator, wherein the non-rotating part is connected to the nacelle, the direct driven wind turbine comprising:
a liquid damper system disposed within a cavity of a hollow shaft of the non-rotating part of the electric generator of the direct driven wind turbine, the liquid damper system located proximate an axis of rotation of the electrical generator;
wherein the liquid damper system is mounted to a side wall of the non-rotating part of the electric generator.

10. The direct driven wind turbine according to claim 9, wherein the liquid damper system at least partially eliminates an unwanted movement of the direct driven wind turbine resulting from wind loads.

11. The direct driven wind turbine according to claim 9, wherein the liquid damper system comprises a rack and at least two liquid tanks.

12. The direct driven wind turbine according to claim 11, further comprising a magnet, wherein the rack is mounted to the non-rotating part of the electric generator by magnetic force.

13. The direct driven wind turbine according to claim 11, wherein the at least two liquid tanks are cuboids, and a width is smaller than a length, and a height is smaller than the width.

14. The direct driven wind turbine according to claim 11, wherein the at least two liquid tanks are arranged in a stacked manner.

15. The direct driven wind turbine according to claim 12, wherein the non-rotating part of the electric generator comprises a stator and the hollow shaft.

16. The direct driven wind turbine according to claim 9, wherein the rotor of the electric generator is arranged rotatably around the non-rotating part of the electric generator.

* * * * *